US011358604B2

(12) United States Patent
John et al.

(10) Patent No.: US 11,358,604 B2
(45) Date of Patent: Jun. 14, 2022

(54) SENSOR SYSTEM FOR A VEHICLE AND METHOD FOR MONITORING A SENSOR

(71) Applicant: Robert Bosch GmbH, Stuttgart (DE)

(72) Inventors: Dirk John, Freiberg (DE); Gunther Lang, Stuttgart (DE); Markus Krieg, Dellfeld (DE); Michael Schmid, Kornwestheim (DE); Simon Koenig, Moeckmuehl (DE)

(73) Assignee: Robert Bosch GmbH, Stuttgart (DE)

( * ) Notice: Subject to any disclaimer, the term of this patent is extended or adjusted under 35 U.S.C. 154(b) by 171 days.

(21) Appl. No.: 16/771,208

(22) PCT Filed: Mar. 13, 2019

(86) PCT No.: PCT/EP2019/056235
§ 371 (c)(1),
(2) Date: Jun. 9, 2020

(87) PCT Pub. No.: WO2019/179840
PCT Pub. Date: Sep. 26, 2019

(65) Prior Publication Data
US 2020/0369287 A1    Nov. 26, 2020

(30) Foreign Application Priority Data

Mar. 21, 2018   (DE) .......................... 102018204286.1

(51) Int. Cl.
*B60W 50/02*    (2012.01)
*B60R 21/0136*    (2006.01)
(Continued)

(52) U.S. Cl.
CPC ..... *B60W 50/0205* (2013.01); *B60R 21/0136* (2013.01); *G07C 5/0808* (2013.01);
(Continued)

(58) Field of Classification Search
CPC ....... B60W 50/0205; B60W 2050/021; B60W 2050/0215; B60R 21/0136;
(Continued)

(56) References Cited

U.S. PATENT DOCUMENTS

| 5,440,913 A | 8/1995 | Crispin et al. |
| 2005/0006886 A1* | 1/2005 | Foo .................. B60R 21/01536 280/735 |

(Continued)

FOREIGN PATENT DOCUMENTS

| DE | 102012222690 A1 | 6/2014 |
| DE | 102016105016 A1 | 9/2017 |

(Continued)

OTHER PUBLICATIONS

International Search Report for PCT/EP2019/056235, dated Feb. 25, 2020.

*Primary Examiner* — Gertrude Arthur Jeanglaude
(74) *Attorney, Agent, or Firm* — Norton Rose Fulbright US LLP; Gerard Messina

(57) ABSTRACT

A sensor system for a vehicle, including a first sensor that detects at least one collision-relevant physical variable and outputs at least one corresponding first sensor signal, and at least one second sensor that, independently of the first sensor, detects at least one collision-relevant physical variable and outputs at least one corresponding second sensor signal, and an evaluation and control unit that receives the at least one first sensor signal and the at least one second sensor signal and evaluates them for the collision detection. A method is also described for monitoring a sensor. The evaluation and control unit uses at least one second comparison signal that is based on the at least one second sensor signal of the at least one second sensor to monitor the first sensor.

16 Claims, 1 Drawing Sheet

(51) Int. Cl.
*G07C 5/08* (2006.01)
*B60R 21/01* (2006.01)
(52) U.S. Cl.
CPC ................ *B60R 2021/0119* (2013.01); *B60R 2021/01027* (2013.01); *B60W 2050/021* (2013.01); *B60W 2050/0215* (2013.01)
(58) Field of Classification Search
CPC .. B60R 2021/01027; B60R 2021/0119; G07C 5/0808
USPC ....................................................... 701/30.3
See application file for complete search history.

(56) References Cited

U.S. PATENT DOCUMENTS

2018/0341016 A1\* 11/2018 Ohmoto ................ G01S 7/4026
2019/0250611 A1\* 8/2019 Costin ................ B60R 16/0231

FOREIGN PATENT DOCUMENTS

| JP | 2005233745 A | 9/2005 |
| JP | 2007069711 A | 3/2007 |
| WO | 0041917 A1 | 7/2000 |

\* cited by examiner

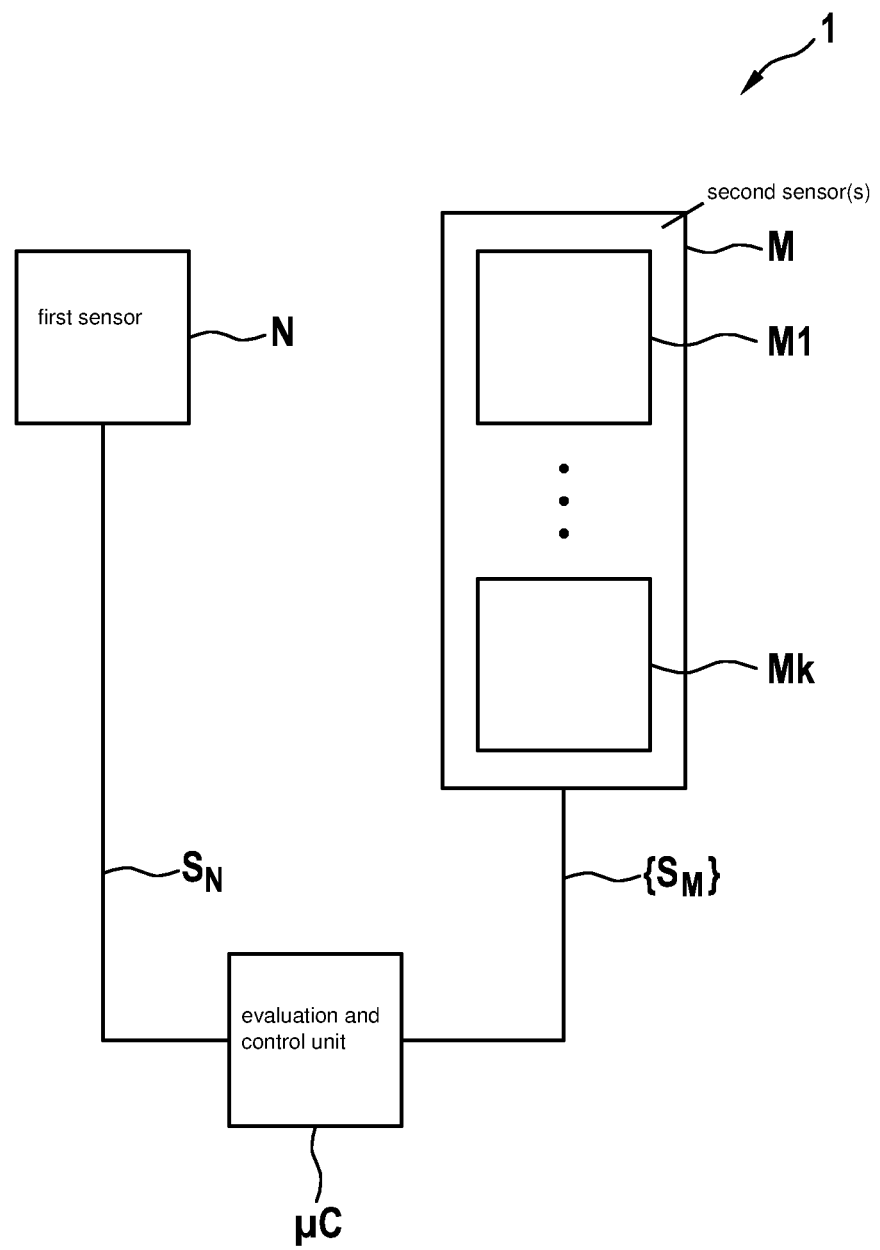

SENSOR SYSTEM FOR A VEHICLE AND METHOD FOR MONITORING A SENSOR

FIELD

The present invention is directed to a sensor system for a vehicle. Moreover, the present invention relates to a method for monitoring a sensor.

BACKGROUND INFORMATION

The detection of vehicle collisions in airbag control units is generally based on the information from sensors, designed as acceleration sensors and/or pressure sensors, for example, that are installed in the vehicle. The measured signals of these sensors are suitably processed (filtered/integrated, for example) and compared to trigger thresholds in order to reach a trigger decision. To avoid an accidental deployment due to a defective sensor, which in normal driving operation outputs high signal values and may exceed the trigger thresholds, a plausibility check may be applied which requires that a second independent sensor likewise outputs signal values that are significantly above signal values for a normal driving situation. Triggering is enabled only when the trigger decision of the main sensor together with the plausibility decision of the independent sensor is present. However, such a plausibility check alone does not provide sufficient protection from accidental deployments. Thus, over the lifetime of the vehicle, situations such as running over a curb with sufficiently high acceleration signals occur in which the plausibility sensor reaches a plausibility decision. If a trigger decision were continuously present due to a defective main sensor, the risk of an accidental deployment would therefore be much too great. For this reason, the plausibility concept merely provides the time for the sensor monitoring, so that it may recognize a defective sensor which may subsequently be deactivated.

Conventional methods for monitoring sensors include those that monitor the sensor hardware itself, and typically run in the sensor itself during the initialization phase after powering on. For example, the sensor may be deflected in a targeted manner and then checked for whether the sensor signal returns exactly to zero after the deflection ceases. In addition, the communication between the sensor and the airbag control unit may be monitored for Manchester errors, for example. Furthermore, monitoring in the airbag control unit may be carried out which checks the output sensor signal for certain implausible characteristics. These include, for example, offset monitoring and/or jump or gradient monitoring. An erroneous offset is characterized, for example, by a high signal amplitude that occurs over a long time period and that corresponds to a nonphysical large speed reduction. A jump error or gradient error is characterized, for example, in that the change in the sensor value from one measured value to the next is greater than allowed by the filter curve of the sensor.

SUMMARY

An example sensor system for a vehicle in accordance with the present invention and an example method for monitoring a sensor in accordance with the present invention may have the advantage that sensor signal errors, for example offset, jump, individual peaks, or arbitrary oscillations, above a certain intensity level may be recognized as defective, regardless of the exact signal shape. The exact shape of the sensor error signal advantageously plays no role above a certain minimum intensity level. In addition, a hypothetical sensor error signal of a defective sensor, which is equivalent to a crash signal, may thus be recognized as an error by comparing it to sensor signals of other intact sensors.

Conventional signal monitoring focuses on a few special cases of an obviously defective sensor signal (offset, jumps, etc.). In practice, however, it has been shown that the sensor error profiles are so diverse that only a fraction may be recognized with this monitoring. Depending on the cause of the sensor defect, sensor error signals also have a great similarity to crash signals, and basically are not distinguishable from crash signals. In accordance with the present invention, a defective sensor signal is not to be recognized by analyzing this one sensor signal by itself. Instead, use is to be made of the fact that multiple sensors are always installed in the vehicle, solely to implement the plausibility check described in the related art. If an intact sensor measures a high acceleration signal or pressure signal that is caused by a collision or an extreme driving maneuver such as running over a curb, other sensors in the vehicle will also measure this event, so that there is no sensor error. In contrast, if the high sensor signal is caused by sensor error, the other sensors measure only weak signals in the range of normal driving situations, so that a sensor error may be deduced. For acceleration sensors, the signal values during normal driving operation are in a range of 1 g, for example.

Specific embodiments of the present invention advantageously reduce the risk of an accidental deployment due to a yet undetected sensor error occurring together with a plausibility decision that results from an extreme driving maneuver.

Specific embodiments of the present invention provide a sensor system for a vehicle, including a first sensor that detects at least one collision-relevant physical variable and outputs at least one corresponding first sensor signal, and at least one second sensor that, independently of the first sensor, detects at least one collision-relevant physical variable and outputs at least one corresponding second sensor signal, and an evaluation and control unit that receives the at least one first sensor signal and the at least one second sensor signal and evaluates them for the collision recognition. The evaluation and control unit uses at least one second comparison signal that is based on the at least one second sensor signal of the at least one second sensor in order to monitor the first sensor, the evaluation and control unit recognizing that the first sensor is defective when at least one first comparison signal, based on the first sensor signal, has a high signal value that is above a predefined first threshold value, and the at least one second comparison signal of the second sensor, used for monitoring the first sensor, at the same time has a low signal value that is below a predefined second threshold value, and/or a deviation function generated from the first comparison signal and the second comparison signal is above a predefined third threshold value.

In addition, an example method for monitoring a sensor in accordance with the present invention is provided which detects at least one collision-relevant physical variable and outputs at least one corresponding first sensor signal, the at least one first sensor signal being evaluated for the collision recognition. At least one second sensor signal of at least one independent further sensor, detected for the collision recognition, is evaluated to recognize a defect of the sensor, a defect of the sensor being recognized when at least one first comparison signal, based on the first sensor signal, has a high signal value that is above a predefined first threshold value, and at least one second comparison signal, based on the at least one second sensor signal of the further sensor and used for monitoring the sensor, at the same time having a low signal value that is below a predefined second threshold value, and/or a deviation function generated from the first comparison signal and the second comparison signal is above a predefined third threshold value.

The at least one first comparison signal may correspond, for example, to the at least one first sensor signal and/or to at least one processed first sensor signal. The at least one second comparison signal may correspond, for example, to the at least one second sensor signal and/or to at least one processed second sensor signal.

In the present context, the evaluation and control unit is understood to mean an electrical device, such as a control unit, in particular an airbag control unit, which processes or evaluates sensor signals detected by sensors. The evaluation and control unit may include at least one interface which may have a hardware and/or software design. In a hardware design, the interfaces may be part of a so-called system ASIC, for example, which contains various functions of the evaluation and control unit. However, it is also possible for the interfaces to be dedicated, integrated circuits, or to be at least partially made up of discrete components. In a software design, the interfaces may be software modules which are present on a microcontroller, for example, in addition to other software modules. Also advantageous is a computer program product including program code that is stored on a machine-readable medium such as a semiconductor memory, a hard disk, or an optical memory, and used for carrying out the evaluation when the program is executed by the evaluation and control unit.

In the present context, a sensor is understood to mean an assembly that includes at least one sensor element that directly or indirectly detects a physical variable or a change in a physical variable and preferably converts it into an electrical sensor signal. The sensor may include, for example, pressure-sensitive sensor elements that ascertain an impact area on the vehicle, and/or acceleration sensor elements that detect acceleration-relevant information of the vehicle, and/or sensor elements that ascertain objects and/or obstacles and/or other collision-relevant data of the vehicle surroundings and provide them for evaluation. Such sensor elements may be based on video and/or radar and/or LIDAR and/or PMD and/or ultrasonic technologies, for example. In addition, signals and information of an existing ABS sensor system and the variables that are derived in the control unit provided for this purpose may be evaluated.

Advantageous enhancements of the example sensor system for a vehicle in accordance with the present invention and of the example method for monitoring a sensor in accordance with the present invention are possible with the measures and refinements described herein.

It is particularly advantageous that the evaluation and control unit may in each case compute an absolute value function of the sensor signals; for processing the sensor signals or the computed absolute value functions, the evaluation and control unit may carry out filtering and/or window integral formation and/or integral formation. There are countless options for the signal processing. A certain level of filtering is generally used for the first sensor signal, since it is preferable not to qualify an error based on a single high sensor value. For this purpose, the first sensor signal or the absolute value of the sensor signal may be filtered, window-integrated, or integrated. The absolute value has the advantage that even strongly oscillating error signals result in high processed first sensor signals. The integration may be started when the first sensor signal exceeds a start threshold. The integrated value may be returned or reset when the first sensor signal once again falls below a reset threshold, which may be identical to the start threshold.

In one advantageous embodiment of the sensor system in accordance with the present invention, the first threshold value may represent a signal value that is significantly above signal values for a normal driving situation. In addition, the second threshold value may upwardly delimit a range of signal values for a normal driving situation. A sensor error of the first sensor to be monitored that is critical for triggering may thus be recognized in that the sensor to be monitored measures high signal values that are significantly above normal driving situations, while at the same time, the second sensors used for monitoring measure low signal values in the range of normal driving situations.

In another advantageous embodiment of the sensor system in accordance with the present invention, the first sensor and the at least one second sensor may detect the same physical variable. Alternatively, the first sensor and the at least one second sensor may detect different physical variables. In addition, the first sensor and the at least one second sensor may have the same detection direction or different detection directions. Furthermore, the first sensor and the at least one second sensor may be situated at the same installation site or at different installation sites. In this way, different concepts in different development stages may advantageously be used for recognizing a defective sensor, depending on the sensor configuration that is available in the vehicle.

In another advantageous embodiment of the sensor system in accordance with the present invention, the evaluation and control unit may deactivate a first sensor that is recognized as defective. The risk of an accidental deployment due to a yet undetected sensor error occurring together with a plausibility decision that results from an extreme driving maneuver is greatly reduced in this way.

In one advantageous embodiment of the method for monitoring a sensor in accordance with the present invention, for defect recognition the first sensor signal and/or the processed first sensor signal may be above the first threshold value for a predefined minimum time period, while the second sensor signal and/or the processed second sensor signal are/is below the second threshold value for a predefined time range that overlaps with the minimum time period for the first sensor signal and/or the processed first sensor signal. This means that the first sensor signal and/or the processed first sensor signal may be recognized as possibly defective if they are above the first threshold value for a predefined minimum time period. The situation may thus be prevented that brief, one-time incorrect measurements result in deactivation of the sensor.

One exemplary embodiment of the present invention is illustrated in the FIGURE and explained in greater detail below.

BRIEF DESCRIPTION OF THE DRAWING

FIG. 1 shows a schematic block diagram of one exemplary embodiment of a sensor system according to the present invention for a vehicle.

DETAILED DESCRIPTION OF EXAMPLE EMBODIMENTS

As shown in FIG. 1, the illustrated exemplary embodiment of a sensor system 1 according to the present invention for a vehicle includes a first sensor N that detects at least one collision-relevant physical variable and outputs at least one corresponding first sensor signal $S_N$, at least one second sensor M that, independently of first sensor N, detects at least one collision-relevant physical variable and outputs at least one corresponding second sensor signal $S_M$, and an evaluation and control unit µC that receives the at least one first sensor signal $S_N$ and the at least one second sensor signal $S_M$ and evaluates them for the collision recognition. Evaluation and control unit pC uses at least one second comparison signal, based on the at least one second sensor signal $S_M$ of the at least one second sensor M, to monitor first sensor N. Evaluation and control unit µC recognizes that first sensor N is defective when at least one first comparison signal, based on the at least one first sensor signal $S_N$, has a high signal value that is above a predefined first threshold value Thd_det, and the at least one second comparison signal, used for monitoring first sensor N, which on the at least one second sensor signal $S_M$ of second sensor M at the same time has a low signal value that is below a predefined second threshold value Thd_drive. Additionally or alternatively, evaluation and control unit µC recognizes that first sensor N is defective when a deviation function $f(S_N, \{S_M\})$ that is generated from the first comparison signal and the second comparison signal is above a predefined third threshold value Thd.

The at least one first comparison signal may correspond to the at least one first sensor signal $S_N$ and/or to at least one processed first sensor signal ($g(S_N)$). The at least one second comparison signal may correspond to the at least one second sensor signal $S_M$ and/or to at least one processed second sensor signal $h_M(S_M)$.

A sensor error of first sensor N that is critical for triggering may thus be recognized in that first sensor N to be monitored measures high signal values $S_N$ significantly above normal driving situations, and sensors $\{M\}$ (M≠N) used for monitoring at the same time have low signal values $S_M$ in the range of normal driving situations. Thus, using sensor signals $\{S_M\}$, a sensor error of first sensor N may be recognized when a deviation function $f(S_N, \{S_M\})$ that assesses the particular sensor signals is above a third threshold value Thd, as is apparent from inequality (1).

$$f(S_N, \{S_M\}) > \text{Thd} \quad (1)$$

Evaluation and control unit µC deactivates a first sensor N that is recognized as defective.

The present invention may be used in different development stages, depending on the sensor configuration that is available in the vehicle.

For localized monitoring, in addition to first sensor N to be monitored, yet further sensors $\{M\}$ are situated at the same installation site in a vehicle. This is provided in the airbag control unit, for example, in which multiple acceleration sensors, which measure in the longitudinal and lateral directions, for example, and optional rotation rate sensors are generally available which, for example, measure a rotation rate about the longitudinal axis or vertical axis. For a significant first sensor signal $S_N$ of first sensor N to be monitored, which is actually measured during a collision or during a severe misuse event such as running over a curb, second sensor signals $S_M$ are also always measured by further sensors $\{M\}$. This often applies even when these further sensors measure a different physical variable. Thus, for example, first sensor N may measure a longitudinal acceleration, and the at least one second sensor M may measure a lateral acceleration or a rotation rate about the longitudinal axis. However, of course the best possible agreement between the measured physical variables is advantageous. In the ideal state, the sensor system for implementing the plausibility concept described in the related art is redundantly designed in the airbag control unit, so that in addition to the main sensor or first sensor N, a second acceleration sensor or a second sensor M having the same measuring direction and very similar sensor properties, such as measuring range, resolution, or filter characteristics, is also present.

In a first exemplary embodiment, if the at least one second sensor M is not directly comparable to first sensor N, for example due to a different detection direction or due to different sensor properties, it is not possible to assess an actual signal deviation between the two sensor signals $S_N$, $S_M$. As is further apparent from FIG. 1, the at least one sensor M is represented by a set of second sensors $\{M\}$ that includes k second sensors M1, ..., Mk. However, it is also possible to use only one second sensor M.

Specific embodiments of sensor system 1 for a vehicle recognize a sensor error by high signal values at first sensor N and low signal values at second sensors $\{M\}$. For this comparison, it is particularly advantageous to use not raw sensor signals $S_N$ and $\{S_M\}$, but, rather, suitably processed sensor signals $g(S_N)$ and $\{h_M(S_M)\}$. Reference symbol g denotes the signal processing function of first sensor signal N, and $h_M$ denotes the signal processing function of at least one second sensor M, which generally may be different for every second sensor M. However, for identical sensors M, identical signal processing functions $h_M(S_M)=h(S_M)$ may also be applied.

In the first exemplary embodiment, a sensor error of first sensor N that is critical for triggering is recognized when processed first signal $g(S_N)$ exceeds predefined first threshold value Thd_det, and processed second sensor signals $\{h_M(S_M)\}$ are below second threshold value Thd_drive. In this variant, processed sensor signal $\{h_M(S_M)\}$ of each sensor M must be below a corresponding sensor-specific second threshold value. However, in a simplified implementation, the set of processed signals $\{h_M(S_M)\}$ may also be combined into a single processed signal $H(\{S_M\})$, for example by selecting a maximum. The query is then simplified to two threshold value comparisons. In the first exemplary embodiment, a first deviation function $f(S_N, \{S_M\})$ that uses evaluation and control unit µC to assess the at least one first sensor signal $S_N$ and the at least one second sensor signal $S_M$, or the at least one processed first sensor signal $g(S_N)$ and the at least one processed second sensor signal $h_M(S_M)$, corresponds to a Boolean function. Equation (1) then becomes equation (2).

$$f(S_N, \{S_M\}) = [g(S_N) > \text{Thd\_Det}] \ \& \ [H(\{S_M\}) < \text{Thd\_drive}] \quad (2)$$

The general condition for error recognition is thus $f(S_N, \{S_M\}) > 0$.

There are countless options for signal processing functions g and h. A certain level of filtering is generally used for first processed sensor signal $g(S_N)$, since it is preferable not to qualify an error based on a single high sensor value. For this purpose, sensor signal $S_N$ or the absolute value of sensor signal $|S_N|$ may be filtered, window-integrated, or integrated. The absolute value has the advantage that even strongly oscillating error signals result in high processed first sensor signals $g(S_N)$. The integration may be started when sensor signal $S_N$ exceeds a start threshold Thd_start. The integrated value may be returned or reset when sensor signal $S_N$ once again falls below a reset threshold Thd_reset, which may be identical to start threshold Thd_start.

In general, functions $h_M$ may be similarly applied. However, typically only weak filtering or no filtering at all is carried out, since a sufficiently high signal value at one of second sensors {M} is already an indication that an actual driving situation is involved. This is all the more true when second sensors {M} do not measure the same physical variable as first sensor N to be monitored.

Existing algorithm features and threshold values of evaluation and control unit μC may also be used for signal processing functions g and h and for threshold values Thd_det and Thd_drive.

In a second exemplary embodiment, a redundant sensor system is present, which means that sensors N, M measure the same physical variable, such as a longitudinal acceleration. An actual driving situation or a collision here should result in a comparable physical measured value of sensors N, M within the tolerances; i.e., the deviation between sensors N, M may be directly assessed. Only one second sensor M that is redundant with first sensor N is generally present here. A similar situation is also present for a pressure hose sensor, which may be used for detecting an impact with a pedestrian. In this case, a pressure hose that is closed off on both sides by a pressure sensor is integrated into the vehicle front end. An impact deforms the hose and results in a pressure rise at both pressure sensors. Depending on the impact site, the pressure signals at both sensors differ from one another slightly (due to run time effects, for example), but are always within a similar range.

Since sensor signals $S_N$, $S_M$ are directly compared to one another in the second exemplary embodiment, it is advantageous to minimize any small differences in the measuring range or filter characteristics or the influence of sensor noise by suitable preprocessing, for example signal limitation or weak prefiltering.

A measure of deviation $k(S_N-S_M)$ may subsequently be directly computed. In turn, an error or defect of first sensor N is recognized only when a significant deviation, possibly over a fairly long time period, is present. For this purpose it is suitable to filter, window-integrate, or integrate signal difference $S_N-S_M$ between first sensor signal $S_N$ and second sensor signal $S_M$, or the absolute value of signal difference $|S_N-S_M|$ between first sensor signal $S_N$ and second sensor signal $S_M$. In order to not sum fairly small signal differences over a fairly long time prior to form a critical overall value, it is suitable to start the integration only when the absolute value of signal difference $|S_N-S_M|$ exceeds start threshold Thd_start. The integrated value may be returned or reset when the value once again falls below reset threshold Thd_reset, which may be identical to the start threshold. If it is intended to limit the computation of measure of deviation k to "normal driving situations" and to exclude possible greater deviations in a collision, a condition according to inequality (3)

$$|S_N|>\text{Thd}1 \ \& \ |S_M|<\text{Thd}2 \quad (3)$$

may also be used as a starting condition for the filtering or summing of the difference signal, threshold values Thd1 and Thd2 being above values of first sensor signal $S_N$ and of second sensor signal $S_M$ that are achievable during normal driving, and a first threshold value Thd1 being significantly above second threshold value Thd2 in order to ensure a sufficient deviation. Summing is then carried out only when the monitoring sensor, i.e., second sensor M, measures a value within the scope of normal driving, and the sensor to be monitored, i.e., first sensor N, detects values outside normal driving due to a sensor error. The summed value may then be returned or reset as soon as one of the two conditions is no longer met. It is also particularly advantageous to evaluate the filtered or integrated signal difference not in absolute terms, but rather, in relative terms, for example with regard to a similarly filtered or integrated first sensor signal $S_N$.

A measure of deviation $k(S_N-S_M)$ computed in this way may now be directly used for error qualification via a threshold value comparison. In this case, equation (1) becomes equation (4).

$$f(S_N,\{S_M\})=k(S_N-S_M)>\text{Thd} \quad (4)$$

The features of the two exemplary embodiments may also be combined with one another in a particularly advantageous manner. In that case, a sensor error is recognized by the AND combination of three criteria: a high (processed) first sensor signal $S_N$ of first sensor N ($g(S_N)>\text{Thd\_det}$), a low (processed) second sensor signal $S_M$ of second sensor M ($h(S_M)<\text{Thd\_drive}$), and a large signal deviation between sensors N and M ($k(S_N-S_M)>\text{Thd}$).

In this case, equation (1) becomes equation (5) and the deviation function is described by a Boolean function having a threshold value of zero.

$$f(S_N,\{S_M\})=[g(S_N)>\text{Thd\_Det}] \ \& \ [h(S_M)\\<\text{Thd\_drive}] \ \& \ [k(S_N-S_M)>\text{Thd}]>0 \quad (5)$$

For delocalized monitoring, no further second sensors M are situated at the installation site of first sensor N to be monitored. Instead, these second sensors M are installed at other locations in the vehicle. Such a situation applies, for example, for peripheral acceleration sensors or pressure sensors.

In this case, during a collision or a misuse event, large differences, in amplitude as well as in temporal characteristics, may occur between the various spatially separate sensor signals $S_N$, $S_M$ that make a direct comparison impossible. Nevertheless, after the end of an event (a collision as well as a misuse event) each vehicle location, and thus each sensor installation site, has experienced the same change in speed. In practice, certain deviations occur, in particular for sensors in the intrusion zone, that are attributable to clipping effects in the sensor or to the twisting of the sensor out of its original measuring direction. However, within certain tolerances, all sensors detect a similar decrease in speed. Thus, when the signal of acceleration sensors having the same measuring direction is integrated over the event, this results in values that may be compared on time scales that are customary for the event. For collisions, however, this decrease in speed of sensors within or close to the intrusion zone is detected more quickly than for sensors outside the intrusion zone. In a misuse event, such as a local hammer blow, a nearby sensor will measure short-term significant changes in speed which, however, die down quickly.

Thus, if high values of the decrease in speed occur only at first sensor N for a certain time period, while other sensors M within a similar time range detect no appreciable decrease in speed, this indicates a sensor error of first sensor N. In the implementation, instead of the decrease in speed at the installation site of first sensor N, it is also possible to use some other sufficiently filtered "macroscopic" first signal $g(S_N)$, the time scales of the filtering or integration here preferably being selected to be long enough to detect the entire event. Analogously, the decreases in speed at the installation sites of second sensors {M} may also be described by second sensor signals $\{h_M(S_M)\}$ that are processed in some other way. It may even be advantageous here to carry out weak filtering or even no filtering at all, since a high signal value at second sensor M already represents an indication for the presence of an actual event. This applies in particular when second sensors M do not have the same detection direction as first sensor N, or measure a different physical variable.

According to the general recognition feature for sensor errors of first sensor N, processed first sensor signal $g(S_N)$ is above first threshold value Thd_det for a predefined minimum time period [t; t+Tmin], and processed second sensor signal $h_M(S_M)$ is below second threshold value Thd_drive in a predefined time range [t−T1; t+T2] that includes minimum time period [t; t+Tmin]. Optional minimum time period Tmin may mask a brief threshold value exceedance of first threshold value Thd_det by first sensor signal $g(S_N)$ in a local misuse event such as a hammer blow. Alternatively, this may also be ensured by selecting first threshold value Thd_det to be sufficiently high. The two optional time periods T1 and T2 take into account the different temporal characteristics at various measuring sites. This means that a sensor error or defect of first sensor N is then present and is recognized when processed sensor signal $g(S_N)$ of first sensor N is above first threshold value Thd_det for a sufficiently long time, and other sensors M in the vehicle measure no appreciable signals, i.e., measure only signals in the normal driving range, within a certain time period before and after this threshold value exceedance of first sensor N.

Specific embodiments of the method according to the present invention for monitoring a sensor N, which detects at least one collision-relevant physical variable and outputs at least one corresponding first sensor signal $S_N$, the at least one first sensor signal $S_N$ being evaluated for the collision recognition, evaluate at least one second sensor signal $S_M$, detected for the collision recognition, of at least one independent further sensor M in order to recognize a defect of sensor N. A defect of sensor N is recognized when at least one first comparison signal, based on first sensor signal $S_N$, has a high signal value that is above a predefined first threshold value Thd_det, and at least one second comparison signal, based on the at least one second sensor signal $S_M$ of further sensor M and used for monitoring sensor N, at the same time has a low signal value that is below a predefined second threshold value Thd_drive. Additionally or alternatively, a defect of sensor N is recognized when a deviation function $f(S_N, \{S_M\})$ that is generated from the first comparison signal and the second comparison signal is above a predefined third threshold value Thd.

As stated above, the at least one first comparison signal may correspond to the at least one first sensor signal $S_N$ and/or to at least one processed first sensor signal ($g(S_N)$), and the at least one second comparison signal may correspond to the at least one second sensor signal $S_M$ and/or to at least one processed second sensor signal $h_M(S_M)$.

First threshold value Thd_det represents a signal value that is significantly above signal values for a normal driving situation. Second threshold value Thd_drive upwardly delimits a range of signal values for a normal driving situation.

Specific embodiments of the present invention recognize a defective sensor as defective and deactivate the sensor that is recognized as defective when a second sensor does not verify the signals of first sensor.

What is claimed is:

1. A sensor system for a vehicle, comprising:
a first sensor configured to detect at least one collision-relevant physical variable and to output at least one corresponding first sensor signal;
at least one second sensor configured to, independently of the first sensor, detect at least one collision-relevant physical variable and to output at least one corresponding second sensor signal; and
an evaluation and control unit configured to receive the at least one first sensor signal and the at least one second sensor signal and to evaluate the at least one first sensor signal and the at least one second sensor signal for a collision detection, and wherein the evaluation and control unit is configured to use at least one second comparison signal that is based on the at least one second sensor signal of the at least one second sensor to monitor the first sensor, the evaluation and control unit configured to recognize that the first sensor is defective when: (i) at least one first comparison signal, which is based on the at least one first sensor signal, has a high signal value that is above a predefined first threshold value, and the at least one second comparison signal of the second sensor, used for monitoring the first sensor, at the same time, has a low signal value that is below a predefined second threshold value, and/or (ii) a deviation function generated from the first comparison signal and the second comparison signal is above a predefined third threshold value.

2. The sensor system as recited in claim 1, wherein the at least one first comparison signal corresponds to: (i) the at least one first sensor signal, and/or (ii) at least one processed first sensor signal, and the at least one second comparison signal corresponds to: (i) the at least one second sensor signal, and/or (ii) at least one processed second sensor signal.

3. The sensor system as recited in claim 2, wherein the evaluation and control unit is configured to compute an absolute value function of each of the first sensor signal and the second sensor signal, and the evaluation and control unit is configured to carrying out a filtering and/or a window integral formation and/or an integral formation, for processing the first sensor signal and the second sensor signal, or the computed absolute value functions.

4. The sensor system as recited in claim 3, wherein the evaluation and control unit starts the integral formation when the first sensor signal or the computed absolute value function of the first sensor signal exceeds a start threshold, and the evaluation and control unit ends the integral formation and resets the integral value when the when the first sensor signal or the computed absolute value function of the first sensor signal falls below a reset threshold.

5. The sensor system as recited in claim 1, wherein the first threshold value represents a signal value that is significantly above signal values for a normal driving situation, the second threshold value upwardly delimiting a range of signal values for a normal driving situation.

6. The sensor system as recited in claim 1, wherein the first sensor and the at least one second sensor detect the same physical variable.

7. The sensor system as recited in claim 1, wherein the first sensor and the at least one second sensor detect different physical variables.

8. The sensor system as recited in claim 1, wherein the first sensor and the at least one second sensor have the same detection direction or have different detection directions.

9. The sensor system as recited in claim 1, wherein the first sensor and the at least one second sensor are situated at the same installation site or at different installation sites.

10. The sensor system as recited in claim 1, wherein the evaluation and control unit deactivates the first sensor when the evaluation and control unit recognizes the first sensor is defective.

11. A method for monitoring a sensor that detects at least one collision-relevant physical variable and outputs at least one corresponding first sensor signal, the method comprising:
- evaluating the at least one first sensor signal for a collision recognition;
- evaluating at least one second sensor signal, of at least one independent further sensor, detected for the collision recognition, to recognize a defect of the sensor; and
- recognizing a defect of the sensor when: (i) at least one first comparison signal, which is based on the first sensor signal, has a high signal value that is above a predefined first threshold value, and at least one second comparison signal, which is based on the at least one second sensor signal of the further sensor and used for monitoring the sensor, at the same time, has a low signal value that is below a predefined second threshold value, and/or (ii) a deviation function generated from the first comparison signal and the second comparison signal is above a predefined third threshold value.

12. The method as recited in claim 11, wherein: the at least one first comparison signal corresponds to: (i) the at least one first sensor signal, and/or (ii) at least one processed first sensor signal, and the at least one second comparison signal corresponds to: (i) the at least one second sensor signal, and/or (ii) at least one processed second sensor signal.

13. The method as recited in claim 12, wherein, the defect of the sensor is recognized when the first sensor signal and/or the processed first sensor signal is above the first threshold value for a predefined minimum time period, while the second sensor signal and/or the processed second sensor signal is below the second threshold value for a predefined time range that overlaps with the minimum time period for the first sensor signal and/or the processed first sensor signal.

14. The method as recited in claim 11, wherein the first threshold value represents a signal value that is significantly above signal values for a normal driving situation, the second threshold value upwardly delimiting a range of signal values for a normal driving situation.

15. The method as recited in claim 11, wherein the first sensor and the at least one second sensor detect the same physical variable and have the same detection direction.

16. The method as recited in claim 11, wherein the first sensor is deactivated when the first sensor is recognized as defective.

* * * * *